No. 770,800. PATENTED SEPT. 27, 1904.
W. C. FENIMORE.
CAP CUTTING GAGE.
APPLICATION FILED NOV. 12, 1903.
NO MODEL.

Witnesses  
Inventor  
W. C. Fenimore.  
By Meard & Brock  
Attorneys

No. 770,800. Patented September 27, 1904.

UNITED STATES PATENT OFFICE.

WILLIAM C. FENIMORE, OF HANCOCKS BRIDGE, NEW JERSEY.

CAP-CUTTING GAGE.

SPECIFICATION forming part of Letters Patent No. 770,800, dated September 27, 1904.

Application filed November 12, 1903. Serial No. 180,903. (No model.)

*To all whom it may concern:*

Be it known that I, WILLIAM C. FENIMORE, a citizen of the United States, residing at Hancocks Bridge, in the county of Salem and the State of New Jersey, have invented a new and useful Improvement in Cap-Cutting Gages, of which the following is a specification.

My invention relates to gages to be used in combination with suitable dies for cutting caps for cans.

The object of my invention is a device by means of which the blanks may be rapidly fed to the die, accurately centered with reference to the die, and the ring cut from the blank automatically separated from the cap formed out of the blank.

My invention consists of the novel features of construction and combination of parts hereinafter described, particularly pointed out in the claims, and shown in the accompanying drawings, in which—

Figure 1:
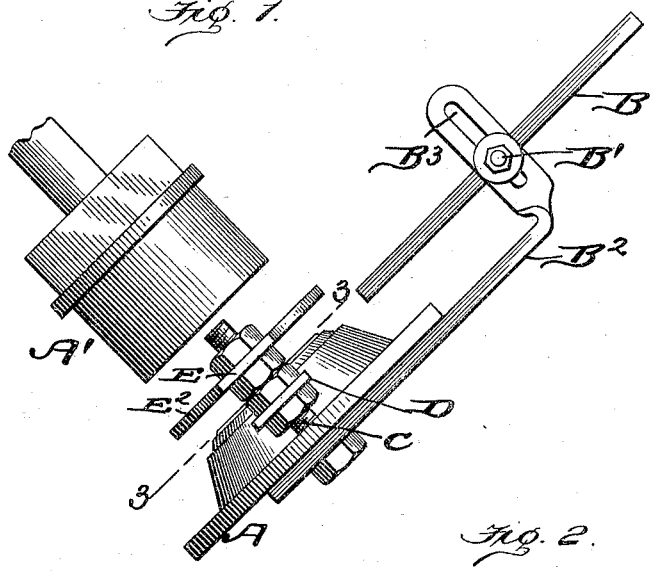
Figure 2:
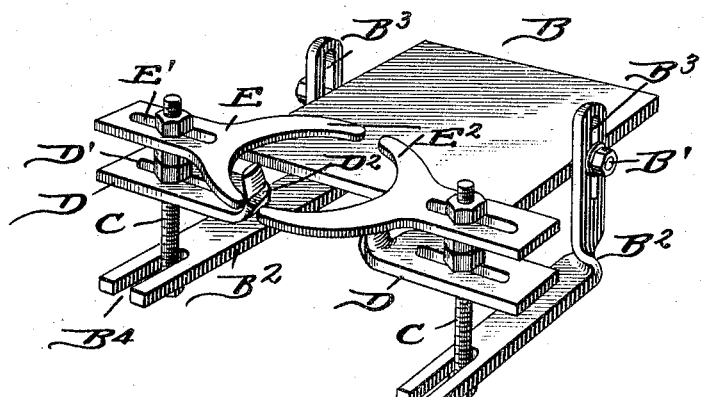
Figure 3:
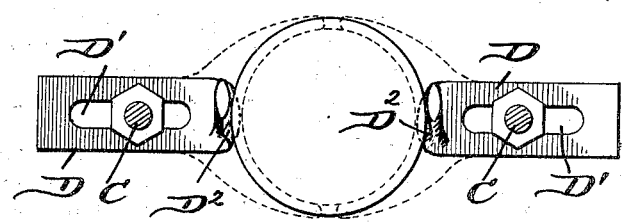
Figure 4:
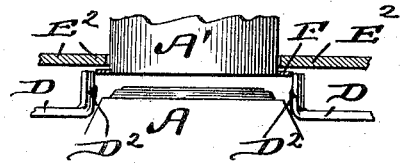

Figure 1 is a perspective view of my device shown in combination with the upper and lower halves of the dies. Fig. 2 is a perspective view of my device, the dies not being shown. Fig. 3 is a section on the line 3 3 of Fig. 1, the blank being shown in full line and the upper gages being shown in dotted lines. Fig. 4 is a side elevation, the upper gages being in section, a portion of the die being shown, and the ring cut from the blank being shown in section encircling the upper half of the die.

It will be understood that the dies used in connection with the device shown in Fig. 2 are of the usual construction and may be of any size.

In the drawings, A indicates the lower half of the die, and A' the upper half.

B is a smooth, preferably metal, platform rectangular in shape, and when the device is in operation this platform is tilted at an angle of about forty-five degrees. Projecting from the sides of this platform are laterally-extending threaded studs B'. A bar B² is twisted or bent at a right angle intermediate its ends, and the shorter upright portion is vertically slotted, as at B³. One of these bars is arranged on each side of the platform or plate B, the studs B' passing through the slots B³. By means of suitable washers and nuts the bars B² are securely clamped to the plate B, and by loosening the nuts the adjustment of the bars may be altered. The slots B³ being longitudinal, the bars are also capable of adjustment so as to bring the horizontal member of the bar nearer to or farther from the plate B. In the use of the terms "vertical" and "horizontal" reference is had to Fig. 2, and the terms are comparative only, as in actual use the parts are on an incline. The free horizontal ends of the bars B² are longitudinally slotted at B⁴. A threaded rod C is held in the slot B⁴ of each bar at a right angle to that part of the bar and substantially parallel with the member secured to the plate, being held by suitable nuts threaded on the rod above and below the bar and capable of adjustment with reference to the bar. These rods carry the gages which form the main part of my invention, which are formed in pairs and consist of an upper and a lower pair. The lower pair is formed of metal plates D, longitudinally slotted, as at D', the rods C passing through said slots and the plates being clamped and held in their adjusted position by suitable nuts working on the rods above and below each plate. At their inner adjacent ends the plates are beveled on the side opposite the plate B, and these beveled ends are bent upwardly, the extreme upper portion being reduced, so that a shoulder D² is formed on the side of each upturned end portion. By means of the slots D' the plates D may be adjusted so as to increase or decrease the distance between the upturned ends.

The upper gages E comprise plates longitudinally slotted at E' and held on the rods C parallel to and above the plates D in the same manner as the latter plates are held and adjustable in the same manner. At their inner adjacent ends the plates E are provided with curved arms adapted to inclose a circular area when the tips of the arms E² are brought together.

In practical use the lower die A works between the longer members of the bars B² and the upper die A' works within the curved arms E². The blanks are placed on the plate B and slide from same to the upturned ends of the plates D and are caught by these arms and rest on the shoulders D². It is understood that the blanks are circular in form and that the plates D are so adjusted with reference to each other and the size of the blank used that the blank cannot pass between them, but is stopped and centered with reference to the die. The lower die forms the cap and the ring cut from the blank sticks upon the upper die A', as shown in Fig. 4. As this die is lifted the ring (shown at F) strikes the under side of the gage E, contacting with the curved arms, and is scraped from the die and drops out of the device into a suitable trough. (Not shown.) It will be noted that the arms E² are spaced a slight distance above the upper ends of the upturned portion of the plates D, so that the rings F can escape after being lifted by the die A' above the said upturned ends. Suitable means are also provided for receiving the cap cut from the blank and formed by the lower die; but such means do not form a part of this invention and are not shown.

I do not desire to limit myself to the use of the gages with any special make of dies, for any special sizes, or for cans of any special form or use.

With the device herein described one man can cut fifteen thousand caps per day of nine hours, the dies being operated by foot-power. It is obvious, however, that any motive power may be used for operating the dies, and the blanks can be fed to the device in any desired manner.

The plate B may be of any length desired.

Having thus fully described my invention, what I claim as new and patentable, and desire to secure by Letters Patent, is—

1. The combination with a die, a pair of adjustable gages adapted to stop and center a blank with reference to said die, and a pair of gages adapted to encircle a portion of the die and eject the ring cut from the blank.

2. The combination with a die formed in upper and lower sections, adjustable gages adapted to encircle loosely the upper section, and a lower pair of gages adapted to center a blank in the path of the lower section of the die.

3. The combination with a sectional die formed in two sections, of an inclined plate, gages adapted to receive a blank from said plate and center same above the lower die, gages arranged above the first-mentioned gages and having curved arms adapted to encircle the upper section of the die and remove therefrom the ring cut from the blank on upward movement of the said section.

4. The combination with dies formed in sections, of an inclined plate, a pair of gages arranged adjacent the lower end of the said plate, said gages having inner upturned end portions having shoulders formed thereon, the said upturned end portions being adapted to receive a blank from the plate and center same in advance of one of the die-sections, gages having curved arms adapted to partially encircle the other section of the die and remove the ring cut from the blank, the said gages being adjustable with reference to each other, to the dies and to the plate, as and for the purpose set forth.

WILLIAM C. FENIMORE.

Witnesses:
GEORGE B. COLEMAN,
JOSEPH PANCOAST.